(12) United States Patent
Yamada

(10) Patent No.: US 8,339,160 B2
(45) Date of Patent: Dec. 25, 2012

(54) CLOCK GENERATING DEVICE AND JITTER REDUCING METHOD IN THE CLOCK GENERATING DEVICE

(75) Inventor: Hideaki Yamada, Shimosuwa (JP)

(73) Assignee: Seiko Epson Corporation (JP)

( * ) Notice: Subject to any disclaimer, the term of this patent is extended or adjusted under 35 U.S.C. 154(b) by 55 days.

(21) Appl. No.: 12/619,947

(22) Filed: Nov. 17, 2009

(65) Prior Publication Data

US 2010/0135373 A1 Jun. 3, 2010

(30) Foreign Application Priority Data

Nov. 28, 2008 (JP) ................. 2008-305249

(51) Int. Cl.
 *H03B 21/00* (2006.01)
(52) U.S. Cl. ......... 327/105; 327/106; 327/107; 375/226
(58) Field of Classification Search .............. 327/105, 327/106, 107; 375/226
 See application file for complete search history.

(56) References Cited

U.S. PATENT DOCUMENTS

| | | | | |
|---|---|---|---|---|
| 5,554,987 A | * | 9/1996 | Ooga | ............................. 341/147 |
| 5,789,950 A | | 8/1998 | Nakagawa | |
| 6,104,252 A | * | 8/2000 | Hofmann | ......................... 331/16 |
| 6,374,388 B1 | | 4/2002 | Hinch | |
| 7,729,872 B2 | | 6/2010 | Obata | |
| 7,953,782 B2 | * | 5/2011 | Mallinson | ..................... 708/271 |

FOREIGN PATENT DOCUMENTS

| | | |
|---|---|---|
| JP | 56-143018 | 11/1981 |
| JP | 06-029745 | 2/1994 |
| JP | 08-154044 | 6/1996 |
| JP | 09-083250 | 3/1997 |
| JP | 10-041748 | 2/1998 |
| JP | 11-008537 | 1/1999 |
| JP | 2001-133485 | 5/2001 |
| JP | 2003-110412 | 4/2003 |
| JP | 2007-286025 | 11/2007 |

* cited by examiner

*Primary Examiner* — John Poos
(74) *Attorney, Agent, or Firm* — Harness, Dickey & Pierce, P.L.C.

(57) ABSTRACT

A clock generating device includes: a DDS circuit that generates a periodic signal; and a comparator that compares an input signal and a reference signal and outputs a binary signal. The clock generating device includes a rate-of-change correcting unit that applies correction for increasing a rate of change at a crossing point with the reference signal to the periodic signal generated by the DDS circuit.

1 Claim, 5 Drawing Sheets

CLOCK GENERATING DEVICE AND JITTER REDUCING METHOD IN THE CLOCK GENERATING DEVICE

BACKGROUND

1. Technical Field

The present invention relates to a clock generating device that generates a clock signal and a jitter reducing method in the clock generating device.

2. Related Art

In the past, there is known a clock generating device employing a DDS (Direct Digital Synthesizer) circuit that generates a periodic signal.

In the clock generating device employing the DDS circuit, in the DDS circuit, a phase accumulator that adds up phases by a value Δphase, which determines angular velocity of a generation frequency, at a time sequentially accumulates and adds up Δphase and, as a result of the accumulation and addition, sequentially outputs, as a digital value, a phase θ for generating angular velocity of a predetermined periodic signal.

The amplitude of a sine wave is acquired as a digital value by a sine-wave converting unit that converts the phase θ into the amplitude of the sine wave.

The amplitude of the sine wave output in this way is converted into an analog signal by a D/A (Digital to Analog) converter, processed through a LPF (Low Pass Filter) in order to remove sampling noise and quantization noise, and output as an output signal of the DDS circuit.

Then, a sine wave signal of a single spectrum is obtained at the output of the DDS circuit.

The sine wave signal is input to a comparator and compared with a reference value of amplitude (e.g., amplitude zero) to output a binarized signal.

Consequently, a clock signal at a fixed cycle can be obtained.

A technique concerning the clock generating device employing the DDS circuit is described in, for example, JP-A-10-41748.

However, in the clock generating device employing the DDS circuit including the technique described in JP-A-10-41748, when a frequency of a clock signal to be generated is reduced, a rate of change (an amount of change per unit time, i.e., changing speed, e.g., in the case of a voltage signal, dV/dt) of an input signal near crossing with the reference value falls. This makes it difficult to generate a clock signal with less jitter.

This is considered to be because, when the rate of change of the input signal near the crossing with the reference value falls in a comparator, the influence of noise on timing of actual crossing increases.

SUMMARY

An advantage of some aspects of the invention is to generate a clock signal with less jitter.

A first aspect of the invention is directed to a clock generating device including: a DDS circuit (e.g., a DDS circuit 20 shown in FIG. 1) that generates a periodic signal; and a comparator (e.g., a comparator 30 shown in FIG. 1) that compares an input signal and a reference signal and outputs a binary signal, wherein the clock generating device includes a rate-of-change correcting unit (e.g., a multiplying unit with limiter 22 shown in FIG. 2) that applies correction for increasing a rate of change at a crossing point with the reference signal to the periodic signal generated by the DDS circuit.

With such a configuration, the periodic signal generated by the DDS circuit has the increased rate of change at the crossing point with the reference signal in the comparator.

According to the aspect of the invention, it is possible to generate a clock signal with less jitter.

A second aspect of the invention is directed to the clock generating device, wherein the DDS circuit includes: a phase accumulator unit (e.g., a phase accumulator 21 shown in FIG. 2) that sequentially outputs a phase of the periodic signal; a sine-wave converting unit (e.g., a sine-wave converting unit 23 shown in FIG. 2) that outputs, on the basis of the phase output from the phase accumulator unit, a digital signal indicating an amplitude value corresponding to the phase; a D/A converter (e.g., a D/A converter 24 shown in FIG. 2) that converts the digital signal output by the sine-wave converting unit into an analog signal; and a LPF (e.g., a LPF 25 shown in FIG. 2) that removes noise from the analog signal, and the rate-of-change correcting unit includes a multiplier (e.g., a multiplying unit with limiter 22 shown in FIG. 2) that multiplies the phase output from the phase accumulator unit by a set multiplication value.

With such a configuration, by increasing angular velocity of the phase sequentially output by the phase accumulator unit, it is possible to easily increase a rate of change of the periodic signal generated by the DDS circuit without changing processing at a post stage.

A third aspect of the invention is directed to the clock generating device which further includes a controller (e.g., a controller 10 shown in FIG. 1) that sets the phase sequentially output by the phase accumulator unit and the multiplication value multiplied by the multiplier of the rate-of-change correcting unit in association with each other.

With such a configuration, it is possible to generate a variable-frequency clock signal with less jitter over a wide frequency range.

A fourth aspect of the invention is directed to a jitter reducing method for a clock generating device including: a DDS circuit that generates a periodic signal; and a comparator that compares an input signal and a reference signal and outputs a binary signal, the jitter reducing method including applying correction for increasing a rate of change at a crossing point with the reference signal to the periodic signal generated by the DDS circuit.

Consequently, the periodic signal generated by the DDS circuit has the increased rate of change at the crossing point with the reference signal in the comparator.

According to the aspects of the invention, it is possible to generate a clock signal with less jitter.

BRIEF DESCRIPTION OF THE DRAWINGS

The invention will be described with reference to the accompanying drawings, wherein like numbers reference like elements.

DESCRIPTION OF EXEMPLARY EMBODIMENTS

A clock generating device and a jitter reducing method in the clock generating device according to an embodiment of the invention are explained below with reference to the accompanying drawings.

Figure 1:
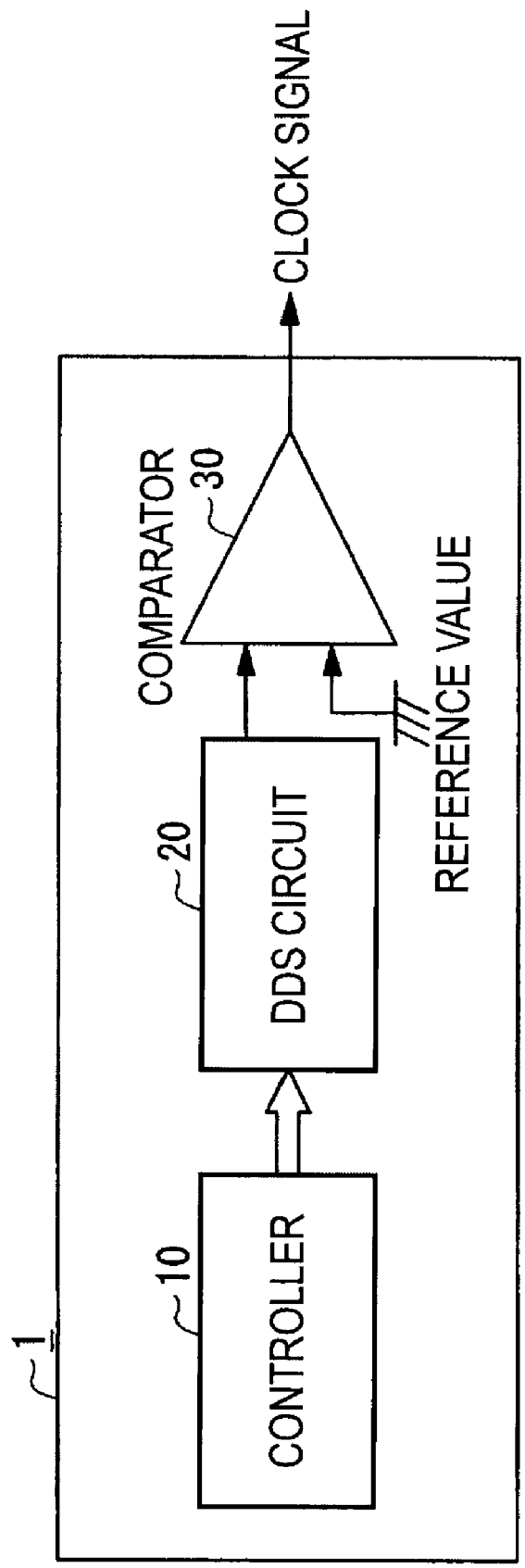
FIG. 1 is a diagram of an overall configuration of a clock generating device according to an embodiment of the invention.

FIG. 1 is a diagram of an overall configuration of a clock generating device 1 according to this embodiment.

In FIG. 1, the clock generating device 1 includes a controller 10, a DDS circuit 20, and a comparator 30.

The controller 10 outputs angular velocity Δphase and a multiplication value G to the DDS circuit 20.

The DDS circuit 20 outputs, as an analog signal, a signal having a frequency corresponding to the angular velocity Δphase set by the controller 10.

Figure 2:
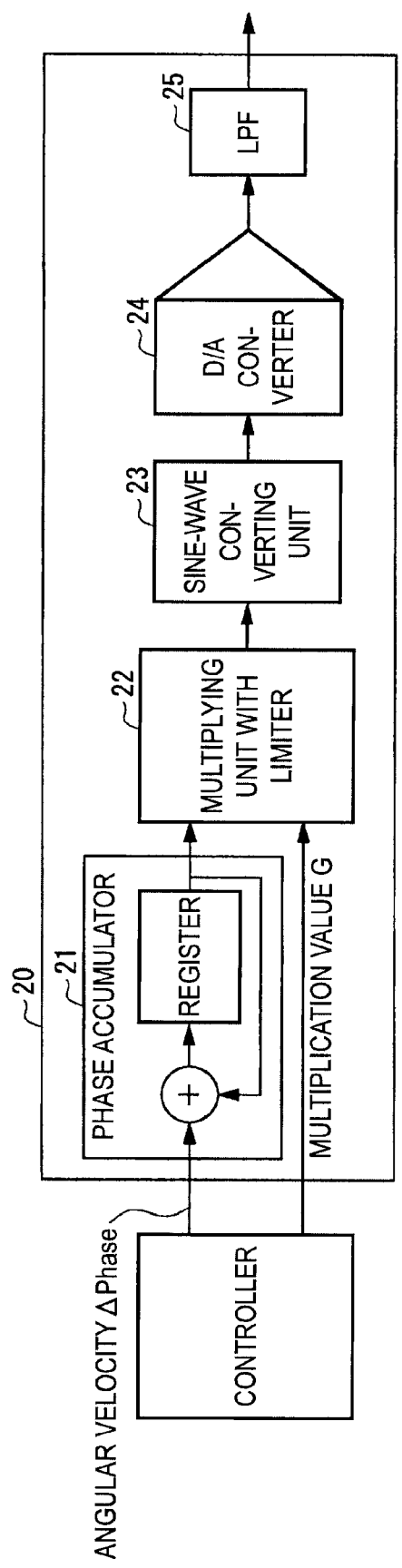
FIG. 2 is a schematic diagram of an internal configuration of a DDS circuit.

FIG. 2 is a schematic diagram of an internal structure of the DDS circuit 20.

In FIG. 2, the DDS circuit 20 includes a multiplying unit with limiter 22 in addition to a phase accumulator 21, a sine-wave converting unit 23, a D/A converter 24, and a LPF 25 included in a DDS circuit in the past.

The phase accumulator 21 accumulates the angular velocity Δphase input from the controller 10, adds the angular velocity Δphase to an output value of the phase accumulator 21, and outputs a phase θ of a result of the addition to the multiplying unit with limiter 22.

The multiplying unit with limiter 22 performs multiplication for increasing, according to the multiplication value G set by the controller 10, angular velocities of phases θ near 0 degree (360 degrees) and 180 degrees with respect to the phase θ input from the phase accumulator 21.

Specifically, when the phase θ input from the phase accumulator 21 is in a range of 0 degree to 90 degrees, the multiplying unit with limiter 22 performs arithmetic operation for multiplying the input phase θ by the set multiplication value G (θ'=G·θ). It is assumed that an upper limit value of a multiplied value θ' is 90 degrees.

When the phase θ input from the phase accumulator 21 is in a range of 90 degrees to 270 degrees, the multiplying unit with limiter 22 performs arithmetic operation for multiplying a difference between the input phase θ and the phase 180 degrees (θ−180 degrees) by the set multiplication value G and adding a result of the multiplication to the phase 180 degrees (θ'=G·(θ−180 degrees)+180 degrees). It is assumed that a lower limit value of the multiplied value θ' is 90 degrees and an upper limit value thereof is 270 degrees.

When the phase θ input from the phase accumulator 21 is in a range of 270 degrees to 360 degrees, the multiplying unit with limiter 22 performs arithmetic operation for multiplying a difference between the input phase θ and the phase 360 degrees (θ−360 degrees) by the set multiplication value G and adding a result of the multiplication to the phase 360 degrees (θ'=G·(θ−360 degrees)+360 degrees). It is assumed that a lower limit value of the multiplied value θ' is 270 degrees.

Actually, the multiplying unit with limiter 22 can be simplified because this input phase value is a binary value. A range of the input phase θ can be discriminated by decoding most significant 2 bits of the binary value. The multiplication can be substituted with a shifter if the multiplication value G is set to the nth power of 2. The limiter can be realized by a method of, for example, taking logical OR of higher order bits shifted-out by the shifter with shifter output data. Alternatively, the limiter can also be realized by incorporating a multiplying function with limiter in the sine-wave converting unit.

The multiplying unit with limiter 22 outputs the multiplication result θ' to the sine-wave converting unit 23.

Figure 3:
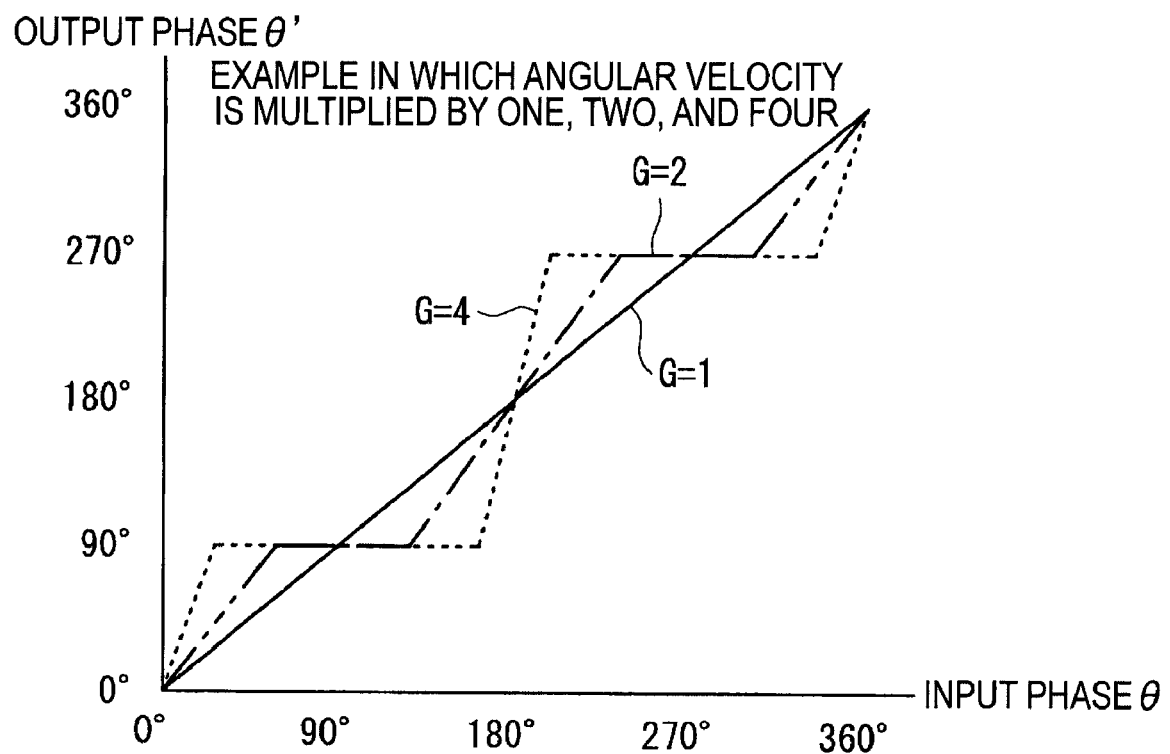
FIG. 3 is a graph of a relation between an input phase and an output phase of a multiplying unit with limiter.

FIG. 3 is a graph of a relation between the input phase θ and the output phase θ' of the multiplying unit with limiter 22.

In FIG. 3, an example in which the multiplication value G is set to one time, two times, and four times is shown.

As shown in FIG. 3, when the multiplication value G is two times and four times, angular velocity of an output phase is increased to two times and four times, respectively, around the phase 0 degree (360 degrees) and 180 degrees compared with angular velocity at the time when the multiplication value G is one time.

Referring back to FIG. 2, the sine-wave converting unit 23 outputs a sine amplitude value with respect to a phase value as input data. When the phase θ' is input from the multiplying unit with limiter 22, the sine-wave converting unit outputs a sine amplitude value y (a digital value) corresponding to the input phase θ' to the D/A converter 24.

Angular velocity of the phase θ' input to the sine-wave converting unit 23 is increased by the multiplying unit with limiter 22 around the phase 0 degree (360 degrees) and 180 degrees. Therefore, the sine amplitude value y output from the sine-wave converting unit 23 is a signal, a rate of change at a crossing point of which is increased around the phase θ'=0 degree (360 degrees) and 180 degrees and is 0 at maximum amplitude at the phase θ'=90 degrees and 270 degrees.

The D/A converter 24 converts the amplitude value y as a digital signal input from the sine-wave converting unit 23 into an analog signal Ya' including sampling noise and quantization noise and outputs the analog signal Ya' to the LPF 25.

The LPF 25 outputs an analog signal Ya obtained by removing the sampling noise and the quantization noise from the analog signal Ya', which is input from the D/A converter 24, to the comparator 30.

Figure 4:
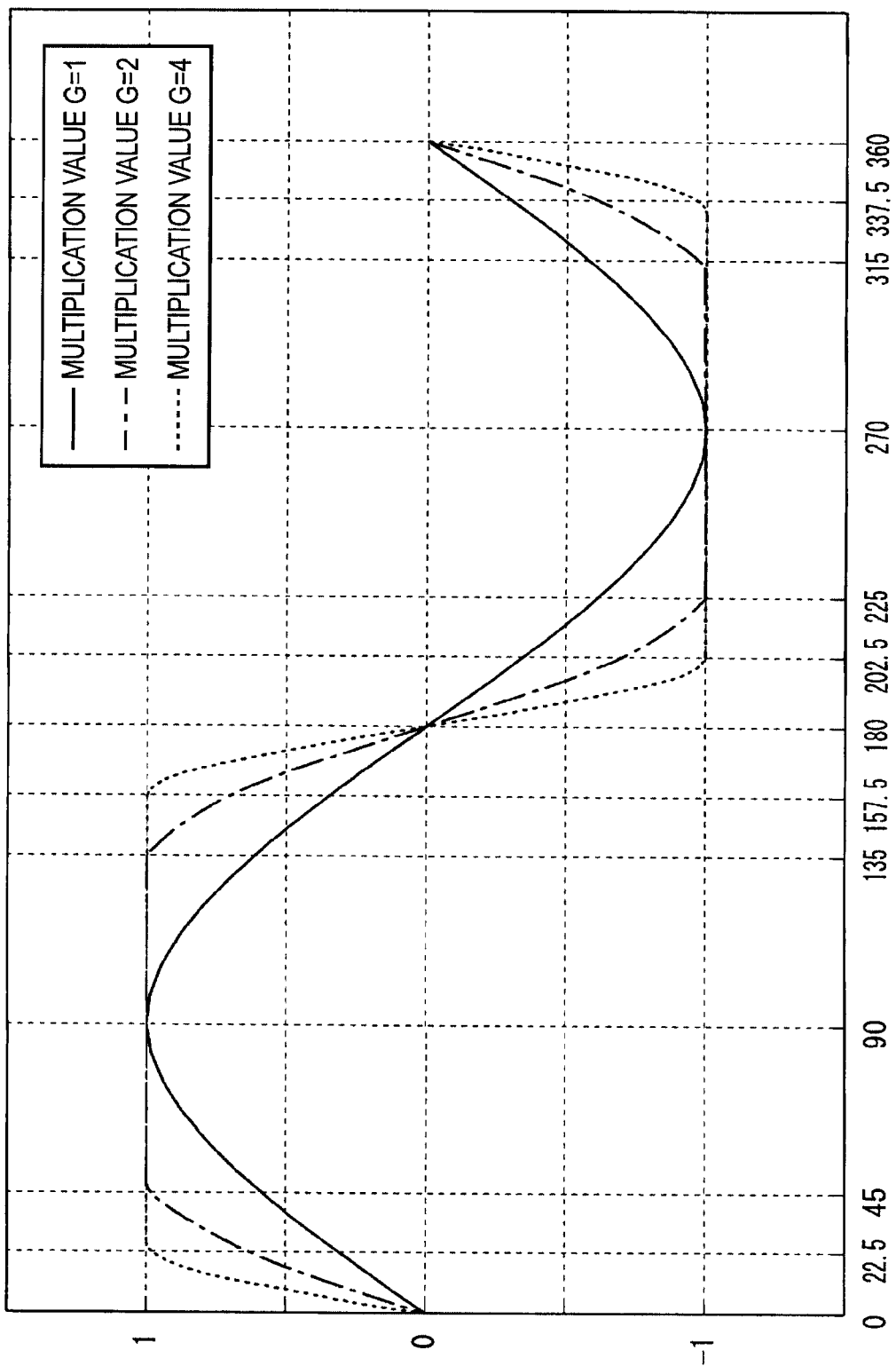
FIG. 4 is a graph of a waveform of a signal output by a LPF.

FIG. 4 is a graph of a waveform of the signal Ya output by the LPF 25.

Processing for increasing angular velocity of an output phase is performed by the multiplying unit with limiter 22 at the pre-stage. Therefore, as shown in FIG. 4, compared with the case in which the multiplication value G is 1 (i.e., the multiplying unit with limiter 22 is not used), a rate of change of the signal Ya output by the LPF 25 near the phase 0 degree (360 degrees) and 180 degrees is increased. Moreover, the signal Ya is within a sine wave band of the increased angular velocity θ'.

Referring back to FIG. 1, the comparator 30 compares the signal Ya input from the DDS circuit 20 with a reference value of amplitude (assumed to be zero) and outputs a binary signal corresponding to a result of the comparison.

Specifically, the output signal of the comparator 30 is a high-level or low-level clock signal.

At this point, a rate of change of the signal Ya input from the DDS circuit 20 near crossing with the reference value in the comparator 30 is increased by the multiplying unit with limiter 22.

In the configuration explained above, an original clock signal is input to the phase accumulator 21, the multiplying unit with limiter 22, the sine-wave converting unit 23, and the D/A converter 24 from a not-shown quartz oscillator or the like. The phase accumulator 21, the multiplying unit with limiter 22, the sine-wave converting unit 23, and the D/A converter 24 operate in synchronization with this original clock signal.

Operation

Operation is explained below.

When the clock generating device 1 operates, the angular velocity Δphase is set by the controller 10. A value corresponding to a frequency of a clock signal generated by the clock generating device 1 is set as Δphase.

The phase accumulator 21 outputs an initial value (e.g., 0 degree) of the phase θ in an initial state. When the value of the angular velocity Δphase is input from the controller 10, the phase accumulator 21 outputs, in synchronization with the original clock signal, the phase θ obtained by adding Δphase to the output phase.

Specifically, the phase accumulator 21 outputs an accumulated value of the phase θ obtained by sequentially adding the value of Δphase to the initial value of the phase θ in synchronization with the original clock signal.

When a value of the multiplication value G is input from the controller 10 and the phase θ is input from the phase accumulator 21, the multiplying unit with limiter 22 performs multiplication for increasing angular velocities of the phase θ near 0 degree (360 degrees) and 180 degrees according to the multiplication value G.

At this point, as explained above, the multiplying unit with limiter 22 performs multiplication processing corresponding to ranges of the phase θ. In each of the ranges, an upper limit value and a lower limit value are provided in a multiplication result.

When the multiplication result θ' of the multiplying unit with limiter 22 is output, the sine-wave converting unit 23 outputs the sine amplitude value y corresponding to the phase θ' to the D/A converter 24.

Then, the D/A converter 24 converts the amplitude value y into the analog signal Ya'. The LPF 25 removes a high-frequency component and outputs the signal Ya as a processing result of the removal to the comparator 30.

The comparator 30 compares the signal Ya and the reference value of amplitude and outputs a binary signal corresponding to a result of the comparison.

At this point, a rate of change near crossing with the reference value of the input signal Ya of the comparator 30 is increased by the multiplying unit with limiter 22.

As a result, the clock signal output by the clock generating device 1 changes to a signal with less jitter.

As explained above, the clock generating device 1 according to this embodiment multiplies, with the multiplying unit with limiter 22, the phase θ as an output of the phase accumulator 21 by the multiplication value G according to the ranges of the phase θ.

The sine-wave converting unit 23 outputs the amplitude value y on the basis of the multiplication result θ'. The processing by the D/A converter 24 and the LPF 25 is performed. The signal Ya as a result of the processing is compared with the reference value of amplitude.

Therefore, the signal Ya is compared with the reference value of amplitude in a state in which the rate of change is increased.

In other words, the clock generating device 1 can generate a clock signal with less jitter.

Figure 5:
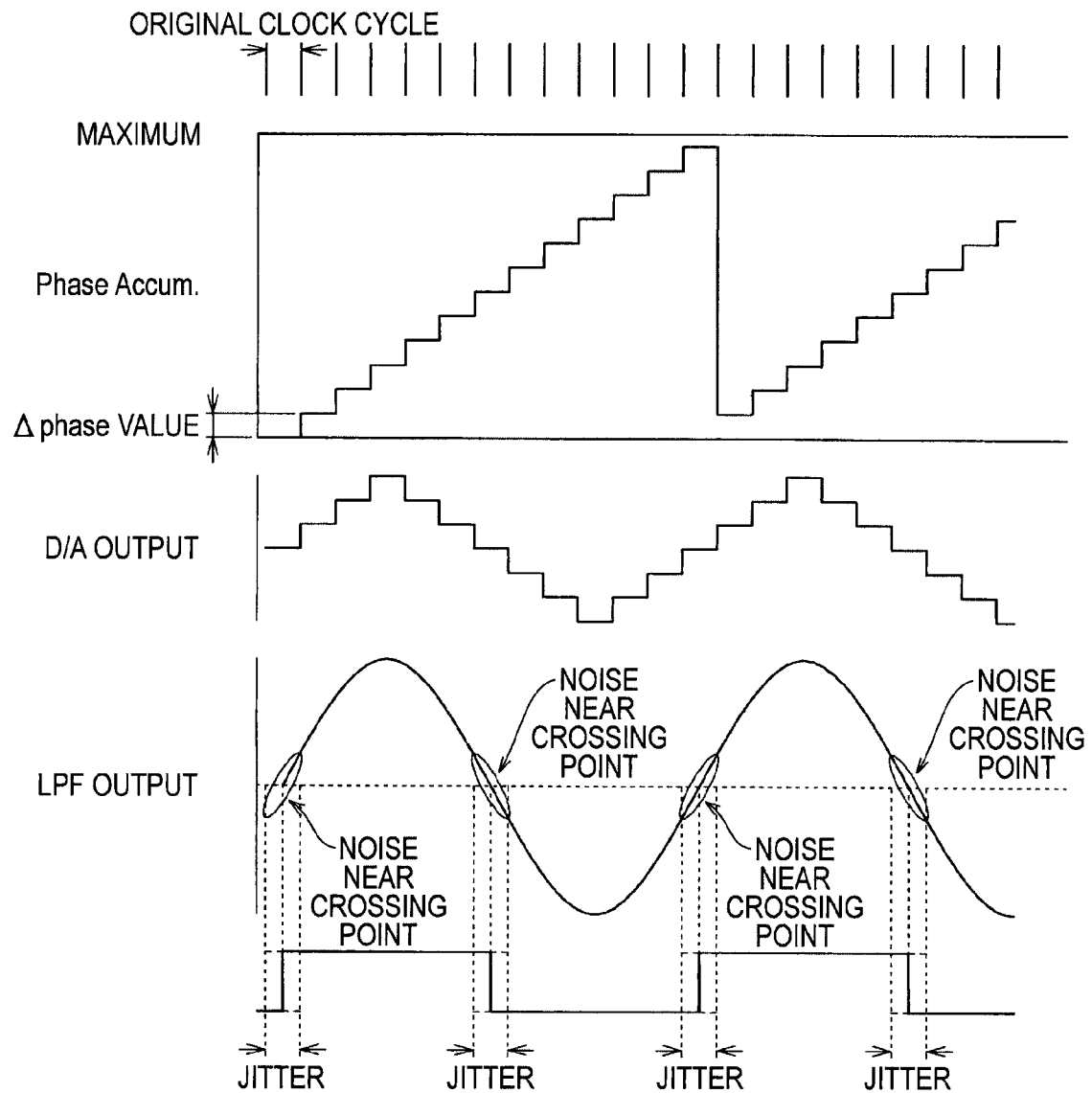
FIG. 5 is a schematic diagram of output signals of units in a general clock generating device employing a DDS circuit.

FIG. 5 is a schematic diagram of output signals of units of a general clock generating device employing a DDS circuit.

In the clock generating device having a general configuration shown in FIG. 5, when a clock frequency to be generated falls near a crossing point where a LPF output crosses a reference value (zero), a rate of change of a sine wave decreases and jitter of an output clock signal increases.

On the other hand, in the clock generating device 1 according to this embodiment, correction for increasing the rate of change is performed near the crossing point of the LPF output. Therefore, jitter of the output clock signal is reduced.

Application Example

In the embodiment explained above, the controller 10 only has to simply output a constant value to the DDS circuit 20. However, it is possible to perform clock generation for setting a clock frequency to be generated variable by setting an output value of the controller 10 variable.

When a generated frequency is set high, since a rate of change is large from the beginning, it is unnecessary to increase the rate of change. Moreover, the number of samples of the phase θ before and after a crossing point is small because a generated clock cycle is short. If the rate of change is increased, the number of samples further decreases and jitter is deteriorated to the contrary. Therefore, the multiplication value G is set to 1 not to perform correction of the rate of change in a frequency range equal to or higher than a certain degree.

When the generated frequency is set low, the multiplication value G is set large according to a degree of setting the generated frequency low. Consequently, the rate of change can be maintained within a proper range.

In this way, the controller 10 outputs the clock frequency to be generated (or the angular velocity Δphase for generating the clock frequency) and the multiplication value G corresponding to the clock frequency in association with each other. This makes it possible to generate a frequency-variable clock signal with less jitter over a wide frequency range.

Japanese Patent Application No. 2008-305249 filed on Nov. 28, 2008, is hereby incorporated by reference in its entirety.

What is claimed is:

1. A clock generating device comprising:
a DDS circuit that generates a periodic signal having a frequency;
a comparator that compares an input signal and a reference signal and outputs a binary signal;
a rate-of-change correcting unit that applies correction for increasing a rate of change at a crossing point with the reference signal to the periodic signal generated by the DDS circuit without changing the frequency of the periodic signal; and
a controller,
wherein the DDS circuit includes:
a phase accumulator unit that sequentially outputs a phase of the periodic signal;
a sine-wave converting unit that outputs, on the basis of the phase output from the phase accumulator unit, an amplitude value corresponding to the phase;
a D/A converter that converts the amplitude value output by the sine-wave converting unit into an analog signal; and
a LPF that removes noise from the analog signal,
wherein the rate-of-change correcting unit includes a multiplier that multiplies a digital signal indicating the phase output from the phase accumulator unit by a set multiplication value; and
the controller that sets the phase sequentially output by the phase accumulator unit and the multiplication value multiplied by the multiplier of the rate-of-change correcting unit in association with each other.

* * * * *